United States Patent [19]

Cockcroft

[11] 4,074,617

[45] Feb. 21, 1978

[54] PISTONS FOR INTERNAL COMBUSTION ENGINES OR FOR COMPRESSORS

[75] Inventor: Frederick Edward Cockcroft, Bradford, England

[73] Assignee: Hepworth & Grandage Ltd., England

[21] Appl. No.: 705,787

[22] Filed: July 16, 1976

[30] Foreign Application Priority Data

Aug. 12, 1975 United Kingdom .............. 33464/75

[51] Int. Cl.² ............................ F16J 1/04; F16J 1/06
[52] U.S. Cl. ................................................ 92/228
[58] Field of Search .......................... 92/228, 230, 229

[56] References Cited

U.S. PATENT DOCUMENTS

| 1,681,621 | 8/1928 | Nelson | 92/228 |
| 1,792,504 | 2/1931 | Nelson | 92/228 |
| 2,238,087 | 4/1941 | Bowser et al. | 92/228 |

FOREIGN PATENT DOCUMENTS 1,394,830  5/1975  United Kingdom .................. 92/228

Primary Examiner—Irwin C. Cohen
Attorney, Agent, or Firm—Mawhinney & Mawhinney & Connors

[57] ABSTRACT

A light metal piston for an engine or compressor has two sheet steel inserts. Each insert has two pairs of elongated bands extending circumferentially away from a gudgeon pin boss. The bands nearer the crown end of the piston skirt are longer than those nearer the open end of the skirt, and preferably are also wider, so as to exert greater thermal expansion control nearer the crown end of the skirt than nearer the open end.

4 Claims, 6 Drawing Figures

PISTONS FOR INTERNAL COMBUSTION ENGINES OR FOR COMPRESSORS

BACKGROUND OF THE INVENTION

1. Field of the Invention

This invention relates to light metal pistons for internal combustion engines or compressors, that is, pistons made of aluminium, magnesium or similar metals and their alloys.

2. Description of the Prior Art

It has been proposed in my U.S. Pat. No. 3,908,521 to provide a light metal piston for an internal combustion engine or a compressor having a crown, a skirt and gudgeon pin bosses, and at least one insert made of a material of lower coefficient of thermal expansion than the light metal and shaped so that at least part of the insert conforms to the internal shape of the piston skirt, whereby to form a bi-metallic element with the light metal of the piston to effect deformation of the shape of the skirt when the piston is heated, each insert having at least one pair of bands extending at least part of the way around the interior of the piston from the regions of the gudgeon pin bosses, each band forming a bi-metallic element with the light metal, one band of said pair being spaced nearer to the piston crown than the other, and the bands of said pair being joined by a connecting portion of the insert in the region of the adjacent gudgeon pin boss.

In the above-mentioned U.S. Pat. in certain embodiments the upper and lower bands were disclosed as being of the same length, and in other embodiments either one or both the bands extended from one of the connecting portions on one side of the gudgeon pin boss around the interior of the piston to another of the connecting portions on the same side of the other gudgeon pin boss.

Both these arrangements have been found to have certain advantages. That in which the upper and lower bands are of the same length tends to effect greater control of thermal expansion near the open end of the skirt by the lower band than near the crown end of the skirt by the upper band, due to the greater stiffness of the skirt where it is joined to the crown. This results in the need to machine the skirt to a smaller diameter at the crown end than at the skirt end, whereas it is desirable that the skirt should be approximately cylindrical so that an approximately equal amount of metal is removed by machining over the whole length of the skirt.

In the embodiments in which a band extends around the interior of the piston from one gudgeon pin boss to the other, it is found that the continuous nature of the bands does not result, contrary to the expectation of those skilled in the art, in the desired degree of control of thermal expansion.

BRIEF SUMMARY OF THE INVENTION

According to the present invention, a light metal piston for an internal combustion engine or a compressor has a crown, a skirt and gudgeon pin bosses, and two inserts made of a material of lower coefficient of thermal expansion than the light metal and shaped so that at least part of the insert conforms to the internal shape of the piston skirt, each insert having two pairs of elongated bands extending part way only around the interior of the piston from the regions of the gudgeon pin bosses, each elongated band forming a bi-metallic element with the light metal, one band of each said pair being nearer to the piston crown and the other band of each said pair being nearer to the open end of the piston skirt, the bands of each said pair being spaced apart and being joined by a connecting portion of the insert in the region of the adjacent gudgeon pin boss, the two pairs of bands of each insert having their connecting portions joined to one another by a further portion of the insert, the bands nearer the piston corwn being substantially longer than those nearer to the open end of the piston skirt, said bands forming distinct bi-metallic elements with the light metal, the longer bands controlling the thermal expansion of the portion of the skirt nearer the piston crown, and the shorter bands controlling the thermal expansion of the portion of the skirt nearer the open end.

Preferably the band which is nearer to the piston crown than the other of said pair of bands is stiffer than said other band; for example the band nearer to the piston crown may be of the same thickness as, but of greater width than, the band nearer to the open end of the skirt.

BRIEF DESCRIPTION OF THE DRAWINGS

A number of embodiments of the invention will now be described with reference to the accompanying drawings, of which:

Referring to FIGS. 1 and 2, the piston has a crown 10, a ring groove band 11 around the periphery of the crown, and a skirt 12 directly connected around its entire periphery to the ring groove band 11. The piston has two gudgeon pin bosses 13 which are integral with the piston skirt 12 and which are connected to the crown by pillars 14. The bosses 13 are formed on parallel chordwise flats 15 on the piston skirt between the thrust face 16 and the opposite, non-thrust face 17. Bores 18 to receive the gudgeon pin are formed in the bosses 13.

The piston is formed of light metal, for example aluminium alloy or magnesium alloy, and is provided with a pair of inserts 19 made of sheet mild steel, on opposite sides of the diameter containing the thrust face 16 and the non-thrust face 17, in order to control the thermal expansion of the piston skirt 12 which results from the heating of the piston from room temperature to its operating temperature in an engine.

Figure 3:
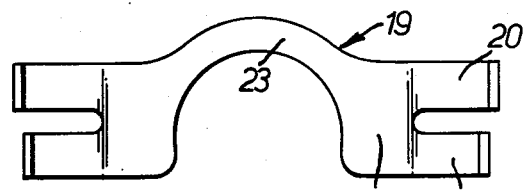
FIG. 3 is an elevation of an insert for use in the piston of FIGS. 1 and 2.
Figure 4:
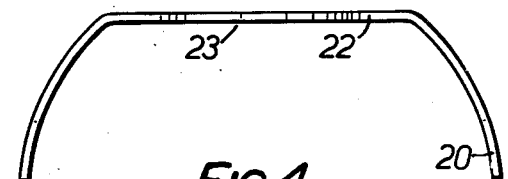
FIG. 4 is a plan view of the insert of FIG. 3.
Figure 5:
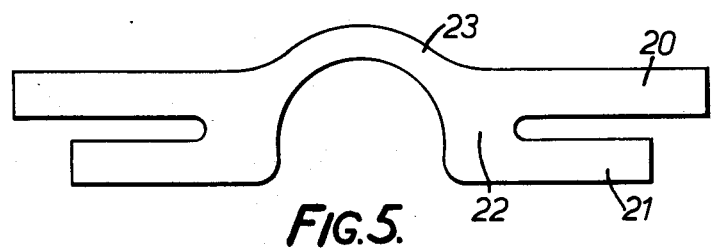
FIG. 5 is a developed view of the insert of FIGS. 3 and 4.

Each insert 19, shown in FIGS. 3 and 4, consists of upper elongated bands 20 and lower elongated bands 21 which extend circumferentially of the piston skirt, part way only around the interior of the piston, so that the free ends of the bands of one insert 19 are spaced from the free ends of the bands of the other insert. The upper and lower elongated bands 20, 21 are spaced apart axially of the piston and are parallel to one another. Each pair, consisting of an upper and a lower band has a connecting portion 22 joining the two bands, and the two connecting portions 22 of each insert are joined to one another by a further portion 23 of the insert. The further portion 23 may pass between the gudgeon pin bore 18 and the crown 10 as shown, or may pass around the side of the gudgeon pin bore nearer the open end of the skirt.

It will be seen that the connecting portions 22 and the further portion 23 of the insert are substantially flat and lie against the chordwise flat 15 of the piston skirt, part at least of the connecting portions 22 and the further portion 23 being embedded in the gudgeon pin boss 13; the bands 20, 21 lie against circumferentially-extending portions of the piston skirt and may be embedded in the skirt so that their inner surface is flush with the inner surface of the skirt.

The band 20 nearer to the piston crown 10 is longer than the other band 21 and is also stiffer than the other band 21 as a result of being of greater width than the other band. Conveniently the insert is formed of a single piece of mild steel sheet, so that the thickness of the parts of the insert are substantially the same.

When the piston is cast, the two inserts 19 are positioned in the mould, and molten light metal is poured to form the piston. On cooling of the light metal, the upper band 20 and lower band 21 of the insert 19 are placed in compression, and the cooperating bands of light metal, which form bi-metallic elements with the bands 20, 21, are placed in tension. When the piston is heated from atmospheric temperature to operating temperature in an engine, the compressive and tensile stresses are relieved, and the upper band 20, being of greater length and stiffness than the lower band 21, exerts a greater influence on the expansion of the piston skirt and causes the end of the skirt nearer to the piston crown to expand by a lesser amount, measured across its diameter at right angles to the gudgeon pin axis, per degree temperature rise, than the part of the skirt controlled by the other band 21.

Figure 1:
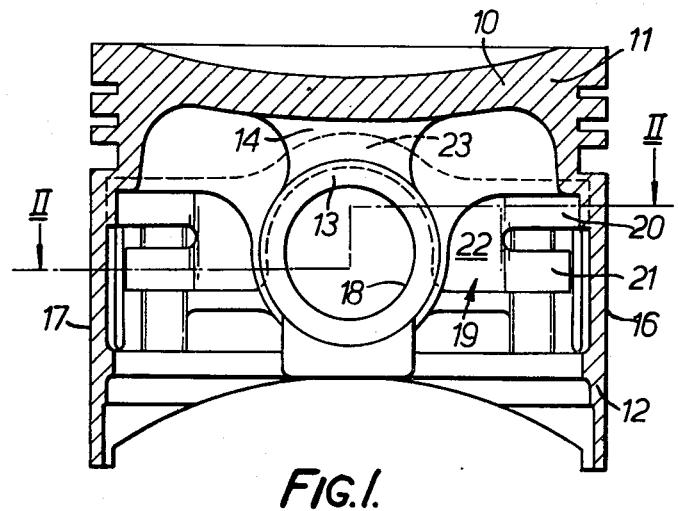
FIG. 1 is a longitudinal cross-section of a piston.
Figure 2:
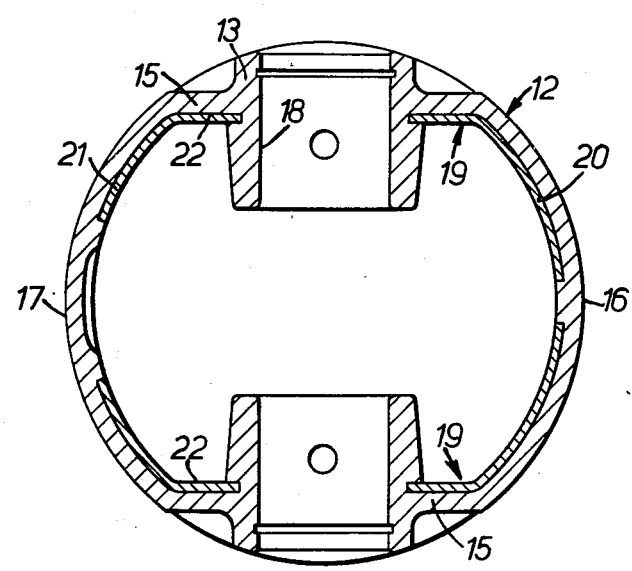
FIG. 2 is a section on the line II—II of FIG. 1.
Figure 6:
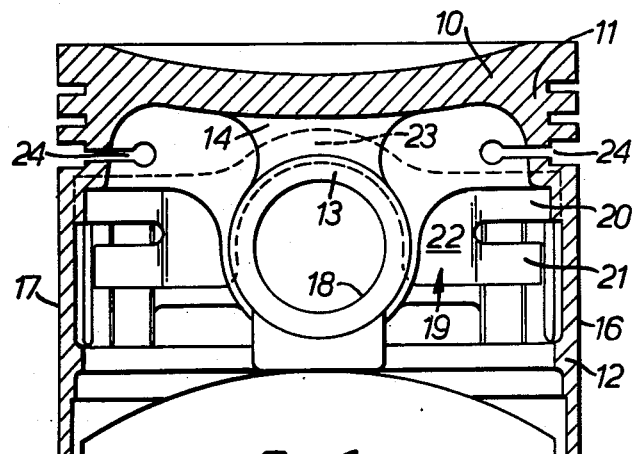
FIG. 6 is a view similar to FIG. 1 of a modified form of piston.

FIG. 6 shows a piston which is identical with that of FIG. 1, except that it incorporates transverse slots 24 between the ring groove band 11 of the crown 10 and the skirt 12. The upper band 20 of each insert 19 is close to the transverse slot 24, and the transverse slot enables the upper band 20 to exert even greater control of the thermal expansion of the upper end of the skirt, by preventing the crown from urging the upper end of the skirt outwards on its thrust and non-thrust faces 16, 17, when the piston is heated.

Instead of the bands 20, 21 being parallel to one another, they may diverge from one another in the direction away from the connecting portion 22.

What is claimed is:

1. A light metal piston for an internal combustion engine or a compressor, having a crown, a skirt integrally connected to said crown in a manner to provide an internal cavity in the piston, and affording opposite thrust faces, gudgeon pin bosses having bores opening into said cavity, and two expansion control inserts made of a material of lower coefficient of thermal expansion than the light metal, each insert conforming to the internal shape of the piston skirt, each said insert having
   - a pair of connecting portions each anchored in a gudgeon pin boss;
   - a further portion interconnecting said pair of connecting portions;
   - a pair of elongated first bands, having the inner face thereof open to said cavity, each extending from a said connecting portion part way only round one of said thrust faces to form a bi-metallic element therewith, each said first band being near the crown end of said skirt;
   - a pair of elongated second bands, having the inner face thereof entirely open to said cavity, each extending from a said connecting portion, being spaced apart from and substantially parallel with and independent from said first bands, each said second band extending part way only round one of said thrust faces to form a bi-metallic element therewith, each said second band being nearer the open end of said skirt than each said first band; said first bands being substantially longer than said second bands,
   - whereby said first bands exert a greater degree of thermal expansion control for a given temperature change than do said second bands.

2. A light metal piston as claimed in claim 1 wherein said piston incorporates a transverse slot on at least one of the opposite thrust faces between the crown and the skirt.

3. A light metal piston as claimed in claim 1 wherein said first bands are also substantially wider than said second bands.

4. A light metal piston as claimed in claim 3 wherein said piston incorporates a transverse slot on at least one of the opposite thrust faces between the crown and the skirt.

* * * * *